(12) United States Patent
Balakrishnan et al.

(10) Patent No.: US 7,724,251 B2
(45) Date of Patent: *May 25, 2010

(54) SYSTEM FOR PHYSICAL ROTATION OF VOLUMETRIC DISPLAY ENCLOSURES TO FACILITATE VIEWING

(75) Inventors: Ravin Balakrishnan, Toronto (CA); Gordon Paul Kurtenbach, Toronto (CA); George William Fitzmaurice, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 11/207,828

(22) Filed: Aug. 22, 2005

(65) Prior Publication Data
US 2005/0275628 A1 Dec. 15, 2005

Related U.S. Application Data

(63) Continuation of application No. 10/188,765, filed on Jun. 28, 2002, now Pat. No. 7,138,997.

(60) Provisional application No. 60/350,952, filed on Jan. 25, 2002.

(51) Int. Cl.
*G06T 15/00* (2006.01)
(52) U.S. Cl. .......................................... 345/419; 359/1
(58) Field of Classification Search ........................ None
See application file for complete search history.

(56) References Cited

U.S. PATENT DOCUMENTS

| | | | |
|---|---|---|---|
| 3,936,026 A * | 2/1976 | Hampel et al. ........... | 248/349.1 |
| 4,134,104 A | 1/1979 | Karras | |
| 4,160,973 A | 7/1979 | Berlin, Jr. | |
| 4,267,555 A * | 5/1981 | Boyd et al. ................... | 345/10 |
| 4,365,779 A * | 12/1982 | Bates et al. ................. | 248/371 |
| 4,473,206 A * | 9/1984 | Stillinger .................... | 248/371 |

(Continued)

OTHER PUBLICATIONS

W. Buxton and G.W. Fitzmaunrice, "HMD's, Caves, and Chameleon: A Human-Centric Analysis of Interaction in Virtual Space," Computer Graphics, vol. 32, No. 4, 1998, pp. 64-68.

(Continued)

*Primary Examiner*—Peter-Anthony Pappas
(74) *Attorney, Agent, or Firm*—Staas & Halsey LLP

(57) ABSTRACT

The present invention is a system that allows a user to physically rotate a three-dimensional volumetric display enclosure with a corresponding rotation of the display contents. The rotation of the enclosure is sampled with an encoder and the display is virtually rotated by a computer maintaining the scene by an amount corresponding to the physical rotation before being rendered. This allows the user to remain in one position while viewing different parts of the displayed scene corresponding to different viewpoints. The display contents can be rotated in direct correspondence with the display enclosure or with a gain (positive or negative) that accelerates the rotation of the contents with respect to the physical rotation of the enclosure. Any display widgets in the scene, such as a virtual keyboard, can be maintained stationary with respect to the user while scene contents rotate by applying a negative rotational gain to the widgets. The rotation can also be controlled by a time value such that the rotation continues until a specified time is reached or expires.

32 Claims, 8 Drawing Sheets

U.S. PATENT DOCUMENTS

| | | | |
|---|---|---|---|
| 4,616,218 A * | 10/1986 | Bailey et al. | 361/682 |
| 4,836,478 A * | 6/1989 | Sweere | 248/279.1 |
| 5,016,849 A * | 5/1991 | Wu | 248/176.3 |
| 5,129,054 A | 7/1992 | Alstad et al. | |
| 5,134,390 A | 7/1992 | Kishimoto et al. | |
| 5,241,656 A | 8/1993 | Loucks et al. | |
| 5,257,347 A | 10/1993 | Busbridge et al. | |
| 5,329,289 A * | 7/1994 | Sakamoto et al. | 345/659 |
| 5,540,229 A | 7/1996 | Collet-Billon et al. | |
| 5,678,015 A | 10/1997 | Goh | |
| 5,697,588 A * | 12/1997 | Gonzalez et al. | 248/221.11 |
| 5,717,415 A | 2/1998 | Iue et al. | |
| 5,724,492 A * | 3/1998 | Matthews et al. | 345/419 |
| 5,754,809 A | 5/1998 | Gandre | |
| 5,767,854 A | 6/1998 | Anwar | |
| 5,805,137 A | 9/1998 | Yasutake | |
| 5,850,225 A | 12/1998 | Cosman | |
| 5,854,449 A | 12/1998 | Adkins | |
| 5,861,583 A | 1/1999 | Schediwy et al. | |
| 5,880,733 A | 3/1999 | Horvitz et al. | |
| 5,898,433 A | 4/1999 | Hijikata | |
| 5,959,614 A | 9/1999 | Ho | |
| 5,973,664 A * | 10/1999 | Badger | 345/659 |
| 6,007,038 A * | 12/1999 | Han | 248/371 |
| 6,008,800 A | 12/1999 | Pryor | |
| 6,008,809 A | 12/1999 | Brooks | |
| 6,024,335 A * | 2/2000 | Min | 248/371 |
| 6,031,519 A | 2/2000 | O'Brien | |
| 6,031,541 A | 2/2000 | Lipscomb et al. | |
| 6,043,818 A | 3/2000 | Nakano et al. | |
| 6,049,317 A | 4/2000 | Thompson et al. | |
| 6,052,100 A | 4/2000 | Soltan et al. | |
| 6,061,004 A * | 5/2000 | Rosenberg | 341/20 |
| 6,064,423 A | 5/2000 | Geng | |
| 6,069,594 A | 5/2000 | Barnes et al. | |
| 6,100,862 A | 8/2000 | Sullivan | |
| 6,115,028 A | 9/2000 | Balakrishnan et al. | |
| 6,152,563 A | 11/2000 | Hutchinson et al. | |
| 6,208,318 B1 | 3/2001 | Anderson et al. | |
| 6,229,542 B1 | 5/2001 | Miller | |
| 6,271,847 B1 | 8/2001 | Shum et al. | |
| 6,346,972 B1 * | 2/2002 | Kim | 348/569 |
| 6,512,498 B1 * | 1/2003 | Favalora et al. | 345/30 |
| 6,522,529 B1 * | 2/2003 | Huilgol et al. | 361/681 |
| 6,575,596 B2 | 6/2003 | Butt | |
| 6,577,330 B1 | 6/2003 | Tsusda et al. | |
| 6,597,358 B2 | 7/2003 | Miller | |
| 6,628,298 B1 | 9/2003 | Debevec | |
| 6,661,426 B1 | 12/2003 | Jetha et al. | |
| 6,697,034 B2 | 2/2004 | Tashman | |
| 6,710,788 B1 | 3/2004 | Freach et al. | |
| 6,753,847 B2 | 6/2004 | Kurtenbach et al. | |
| 6,765,566 B1 | 7/2004 | Tsao | |
| 6,774,914 B1 | 8/2004 | Benayoun | |
| 6,842,175 B1 | 1/2005 | Schmalstieg et al. | |
| 6,954,218 B2 | 10/2005 | Stall | |
| 2001/0028369 A1 | 10/2001 | Gallo et al. | |
| 2002/0008676 A1 | 1/2002 | Miyazaki et al. | |
| 2002/0033849 A1 | 3/2002 | Loppini et al. | |
| 2002/0085020 A1 | 7/2002 | Carroll | |
| 2002/0135539 A1 | 9/2002 | Blundell | |
| 2003/0142136 A1 | 7/2003 | Carter et al. | |
| 2004/0212605 A1 | 10/2004 | Fitzmaurice et al. | |
| 2005/0062684 A1 | 3/2005 | Geng | |

OTHER PUBLICATIONS

M. Czemuszenko et al., "The ImmersaDesk and Infinity Wall Projection-Based Virtual Reality Displays," Computer Graphics, vol. 31, No. 2, 1997, pp. 46-49.

D. Ebert et al., "Realizing 3D Visualization using Crossed-Beam Volumetric Displays," Comm. ACM, vol. 42, No. 8, 1999, pp. 101-107.

M. Lucente, "Interactive Three-Dimensional Holographic Displays: Seeing the Future in Depth," Computer Graphics, May 1997, pp. 63-67.

M. Sinclair, "The Haptic Lens," Proc. Siggraph 97, ACM Press, New York, 1997, p. 179.

T. Murakami and N. Nakajima, "Direct and Intuitive Input Device for 3D Shape Deformation," Proc. Computer- Human Interaction (CHI 94), ACM Press, New York, 1994, pp. 465-470.

R. Balakrishnan et al., "The Rockin'Mouse: Integral 3D Manipulation on a Plane," Proc. Computer-Human Interaction (CHI 97), ACM Press, New York, 1997, pp. 311-318.

G. Fitzmaurice, H. Ishii, and W. Buxton, "Bricks: Laying the Foundations for Graspable User Interfaces," Proc. Computer-Human Interaction (CHI 95), ACM Press, New York, 1995, pp. 442-449.

S. Zhai, W. Buxton, and P. Milgram, "The 'Silk Cursor': Investigating Transparency for 3D Target Acquisition," Proc. Computer-Human Interaction (CHI 94), ACM Press, New York, 1994, pp. 459-464.

B. Conner et al., "Three Dimensional Widgets," Computer Graphics, vol. 22, No. 4, 1992, pp. 121-129.

G. Fitzmaurice et al., "An Exploration into Supporting Artwork Orientation in the User Interface," Proc. Computer-Human Interaction (CHI 99), ACM Press, New York, 1999, pp. 167-174.

Ken-ichi Kameyama, et al.,"Virtual Surgical Operation System Using Volume Scanning Display", Image Capture, Formatting, and Display, SPIE, vol. 2164, Medical Imaging 1994, pp. 146-154.

Michael Halle, "Autostereoscopic Displays and Computer Graphics", Computer Graphics, ACM SIGGRAPH, 31(2), May 1997, pp. 58-62.

Gregg Favalora et al., "Volumetric Three-Dimensional Display System with Rasterization Hardware", SPIE, vol. 4297A, Feb. 2001.

E. Sachs, A. Roberts and D. Stoops, "3-Draw: A Tool for the Conceptual Design of Three Dimensional Shape", IEEE Computer Graphics and Applications, Jan. 1990.

K. Kameyama and K. Ohtomi, "A Direct 3-D Shape Modeling System", IEEE, pp. 519-524.

J. Viega et al., "3D Magic Lenses", UIST 1996, Seattle, Washington, pp. 51-58.

K. Kameyama, K. Ohtomi and Y. Fukui, "Interactive Volume Scanning 3-D Display with an Optical Relay System and Multidimensional Input Devices", SPIE vol. 1915 Stereoscopic Displays and Applications IV (1993), pp. 12-20.

K. Kameyama and K. Ohtomi, "A Shape Modeling System with a Volume Scanning Display and Multisensory Input Device", Presence: vol. 2, No. 2, 1993, pp. 104-111.

K. Kameyama and K. Ohtomi, "VR System Using Volume Scanning Display and Multi-Dimensional Input Device", ISMCR, Nov. 1992, pp. 473-479.

K. Kameyama, K. Ohtomi and Yukio Fukui, "A Virtual Reality System Using a Volume Scanning 3D Display", 1991.

PCT International Search Report, PCT/US03/02341, filed Jan. 27, 2003, mailed Aug. 8, 2003.

Written Opinion, PCT IPEA, Dec. 11, 2003, 6 pp.

U.S. Appl. No. 10/183,970, filed Jun. 28, 2002, Kurtenbach et al., Alias Systems Corp.

U.S. Appl. No. 10/183,966, filed Jun. 28, 2002, Kurtenbach et al., Alias Systems Corp.

U.S. Appl. No. 10/183,968, filed Jun. 28, 2002, Fitzmaurice et al., Alias Systems Corp.

U.S. Appl. No. 10/183,945, filed Jun. 28, 2002, Fitzmaurice et al., Alias Systems Corp.

U.S. Appl. No. 10/183,944, filed Jun. 28, 2002, Balakrishnan et al., Alias Systems Corp.

U.S. Appl. No. 10/188,765, filed Jun. 28, 2002, Balakrishnan et al., Alias Systems Corp.

R. Balakrishnan et al., "User Interfaces for Volumetric Displays", Mar. 2001, (IEEE).

"Multi-Finger Gestural Interaction with 3D Volumetric Displays", Grossman et al., UIST, ACM 2004, Oct. 2004, pp. 61-70.

"A User Interface to a True 3-D Display Device", Hobbs et al., Proceedings of 5th Int'l Conference on Human-Computer Interaction, Aug. 1993, pp. 579-584.

Mine. Virtual Environment Interaction Techniques. Technical Report. University of North Carolina at Chapel Hill. 1995.

Bowman et al., An Evaluation of Techniques for Grabbing and Manipulating Remote Objects in Immersive Virtual Environments. Proceedings of the 1997 Symposium on Interactive 3D Graphics. ACM Press. 1997.

Hinckley et al., A Survey of Design Issues in Spatial Input. Proceedings of the 7th Annual ACM Symposium on User Interface Software and Technology. ACM Press. 1994.

Grossman et al., Pointing at Trivariate Targets in 3D Environments. Proceedings of the SIGCHI Conference on Human Factors in Computing Systems. ACM Press 2004.

The Rockin' Mouse: Integral 3D Manipulation on a Plane. Balakrishnan et al. Proceedings of 1997 ACM Conference on Human Factors in Computing Systems. 1997. pp. 311-318.

An Exploration into Supporting Artwork Orientation in the User Interface. Fitzmaurice et al. Proceeding of 1999 ACM Conference on Human Factors in Computer Systems. ACM Press, New York, 1999. pp. 167-174.

Foley et al. Computer Graphics: Principles and Practice. Addison-Wesley Publishing Company, Inc. 1997. p. 741-745.

"Actuality Systems—Spatial 3D", URL http://www.actuality-systems.com/index.php/actuality/layout/set/print.

"Spatial 3D: The End of a Flat Screen Thinking", Gregg Favlora and Cameron Lewis, Actuality Systems, Inc., Jul. 2003, First in a Series of Three Papers, pp. 1-6.

* cited by examiner

DISPLAY ENCLOSURE
3D OBJECT
BASE ORIENTATION ROTATION 0°
OBJECT ROTATION 0°

ROTATION 45°

ROTATION 90°

BASE ORIENTATION ROTATION 0°
OBJECT ROTATION 0°

ROTATION 45°

ROTATION 90°

| | FIG. 10A | FIG. 10B | FIG. 10C |
|---|---|---|---|
| BASE ORIENTATION | 0° | 45° | 90° |
| USER INTERFACE WIDGET ORIENTATION | 0° | 0° | 0° |
| DATA OBJECT ORIENTATION | 0° | 45° | 90° |
| USER INTERFACE WIDGETS | {W₁, W₂, W₃} | | |
| DATA OBJECTS | {F} | | |

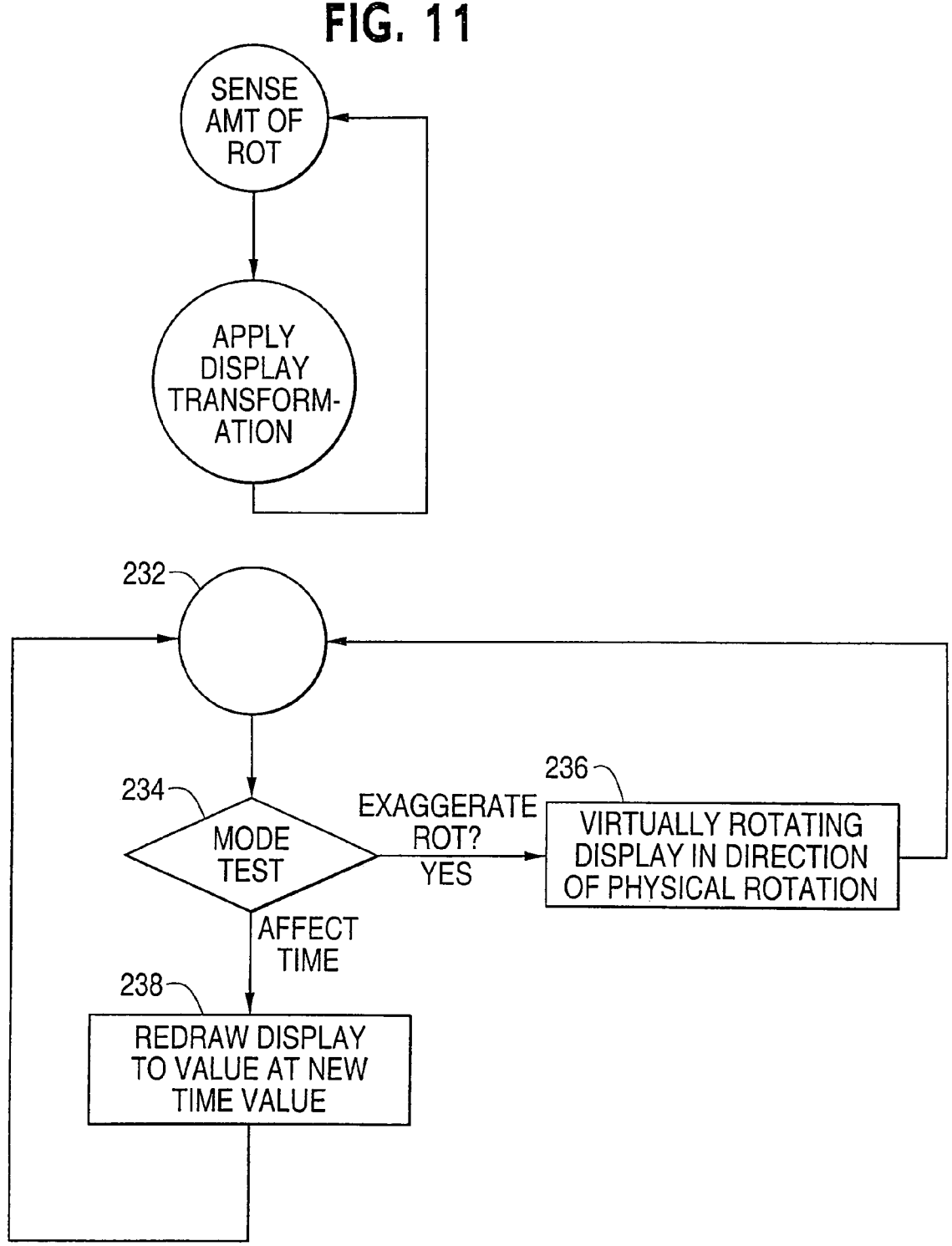

SYSTEM FOR PHYSICAL ROTATION OF VOLUMETRIC DISPLAY ENCLOSURES TO FACILITATE VIEWING

CROSS-REFERENCE TO RELATED APPLICATION(S)

This application is a Continuation of application Ser. No. 10/188,765 filed Jun. 28, 2002, now U.S. Pat. No. 7,138,997, which is related to and claims priority to U.S. provisional application entitled User Interfaces For Volumetric Displays having Ser. No. 60/350,952, by Kurtenbach et al, filed Jan. 25, 2002, this application is also related to U.S. application entitled Three Dimensional Volumetric Display Input And Output Configurations having Ser. No. 10/183,970, by Kurtenbach et al, now U.S. Pat. No. 6,753,847, to U.S. application entitled Volume Management System For Volumetric Displays having Ser. No. 10/183,966, by Kurtenbach et al, filed herewith, to U.S. application entitled Widgets Displayed And Operable On A Surface Of A Volumetric Display Enclosure, having Ser. No. 10/183,945, by Fitzmaurice et al, filed concurrently herewith, to U.S. application entitled Graphical User Interface Widgets Viewable And Readable From Multiple Viewpoints In A Volumetric Display, having Ser. No. 10/183,968, by Fitzmaurice et al, now U.S. Pat. No. 7,205,991, to U.S. application entitled Techniques For Pointing To Locations Within A Volumetric Display, having Ser. No. 10/183,944, by Balakrishnan et al, filed concurrently herewith and all of which are incorporated by reference herein.

BACKGROUND OF THE INVENTION

1. Field of the Invention

The present invention is directed to a system for rotating a class of three-dimensional (3D) displays called volumetric displays and, more particularly, to a system that allows a user to rotate the display to view different parts of the scene within the display without having to move or walk around the display.

2. Description of the Related Art

A class of three-dimensional (3D) displays, called volumetric displays, is currently undergoing rapid advancement. The types of displays in this class include holographic displays, swept volume displays and static volume displays. Volumetric displays allow for 3D graphical scenes to be displayed within a true 3D volume. Because the technology of these displays is undergoing rapid development those of skill in the art are concentrating on the engineering of the display itself. As a result, the man-machine interface to these types of displays is receiving scant attention.

While the volumetric displays allow a user to view different parts of a true 3D scene, the act of viewing the different parts typically requires that the user physically move around the display. For example, if the user wants to view the backside of a scene including a building, the user must move to the backside of the display to see the back of the building. This movement is typically performed by the user walking around the display. Requiring the user to physically move around the display for an extended period of time is probably not the best way to work with these types of displays. And some movements may also be impractical, such as moving above the display for a view from above.

Another approach to viewing the different parts of the display is for the user to virtually navigate around the scene using camera navigation techniques. For large complicated scenes, rendering the scene for each increment of camera navigation can be computationally expensive, with the result that slow refresh rates detract from the user's experience. What is needed is a system that will allow a user to physically rotate the display.

SUMMARY OF THE INVENTION

It is an aspect of the present invention to provide a system that allows a user of a three-dimensional volumetric display to remain in one position while rotating the display, either directly by hand or through a rotation mechanism that could include a motor drive, so that scene objects are rotated within the display and can be see from different viewpoints.

It is another aspect of the present invention to allow a user to rotate a display enclosure and thereby rotate the contents of the display.

It is also an aspect of the present invention to maintain orientation of widgets in the display with respect to the user while display contents rotate.

It is a further aspect of the present invention to allow a gain to be applied to the virtual rotation of the display with respect to the physical rotation of the enclosure.

It is an additional aspect of the present invention to allow users to intuitively control a dome or ball shaped display by placing their hands on the enclosure of the display and moving the display with their hands in a direction based on the intuitive hand control.

The above aspects can be attained by a system that allows a user to physically rotate a three-dimensional volumetric display enclosure with a corresponding rotation of the display contents. This allows the user to remain in one position while being able to view different parts of the displayed scene from different viewpoints. The display contents can be rotated in direct correspondence with the display enclosure or with a gain that accelerates the rotation of the contents with respect to the physical rotation of the enclosure. Any display widgets in the scene, such as a virtual keyboard, can be maintained stationary with respect to the user while scene contents rotate.

These together with other aspects and advantages that will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 11 depicts time based or spatial rotation operations.

DETAILED DESCRIPTION OF THE PREFERRED EMBODIMENTS

Figure 1:
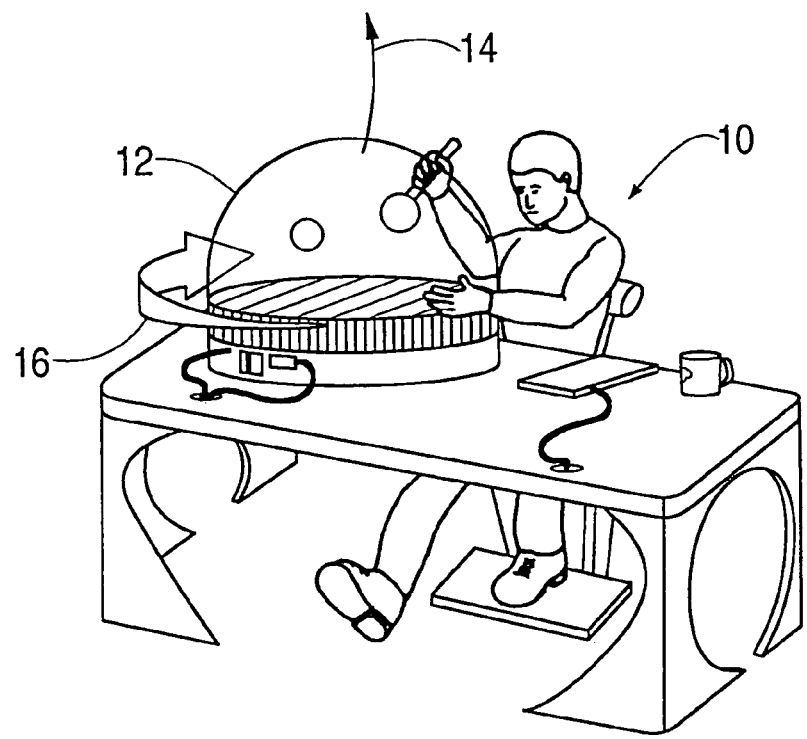
FIG. 1 depicts a user rotating an enclosure and the corresponding display with one degree of freedom.
Figure 2:
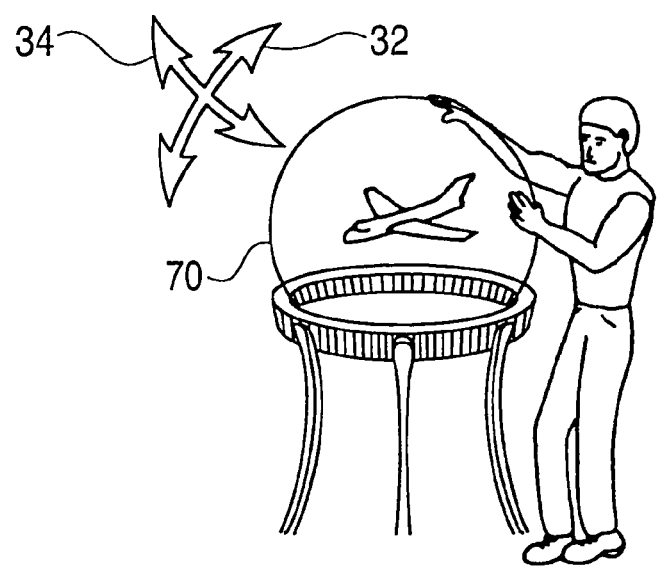
FIG. 2 shows rotations with two or three degrees of freedom.

The present invention is directed to a system that allows a user to physically rotate an enclosure for a three-dimensional (3D) volumetric display to thereby rotate the scene displayed within the enclosure so the user can view different parts of the scene without the user being required to physically move around the display (or to navigate a virtual camera type view of the scene. A combination of physical rotation of the display and manipulation of the virtual camera either thru turning the display or thru some other input device is also useful. For example, turning the physical display to rotate the contents of the display while at the same time moving a mouse to magnify the contents. FIG. 1 illustrates the user 10 spinning the enclosure 12 about a center or vertical axis 14 by physically pushing the enclosure with his hands in contact with the enclosure 12. As the enclosure moves so does the scene displayed therein. This motion allows one degree of freedom 16 of rotation in the movement of the scene displayed within the enclosure 12. The enclosure rotation is much like a "lazy-susan" type platform. FIG. 2 depicts an enclosure 30 that can be rotated with two degrees of freedom 32 and 34. This enclosure 30 can be rotated like a ball thus permitting three degrees of rotation. In both of these embodiments the control interface, that is, the ability of the user to control the rotation of the display contents, is accessible from any direction that the user approaches the enclosure or from any view point around the enclosure. That is, the interface is omni-viewpoint directionally accessible and controllable.

The rotation or movement of the displayed scene with the rotation or movement of the enclosure can be accomplished in a number of different ways. The display mechanism, such as a holographic projector, can be physically rotated with the enclosure. Such an embodiment where the display apparatus is inside the enclosure requires that the display interface, particularly, the power and display inputs, be coupled through a conventional rotating connection. The power and display inputs can also be supplied electromagnetically similar to the way that smart cards are supplied with power and I/O data. By rotating the entire display mechanism, the contents need not be redrawn each time the display is moved. In an alternate embodiment the displayed scene can be virtually rotated responsive to the rotation of the enclosure. That is, as the enclosure is rotated the scene can be redrawn to correspond to the enclosure rotation. The virtual rotation of the scene within the enclosure does not require that the display apparatus be rotated and a rotational or electromagnetic coupling is not needed. Also, some combination of virtual rotation and physical rotation can be used.

Figure 3:
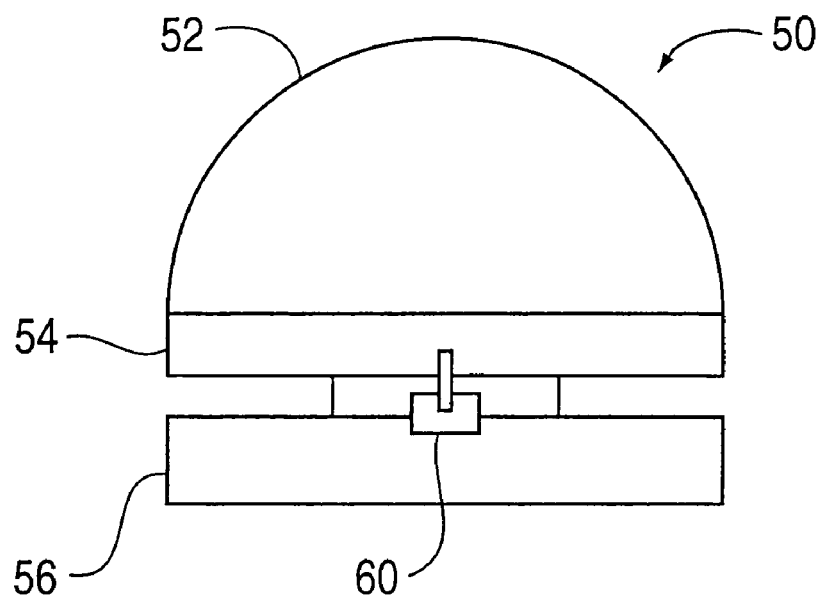
FIGS. 3 and 4 illustrate components of a rotating enclosure.
Figure 4:
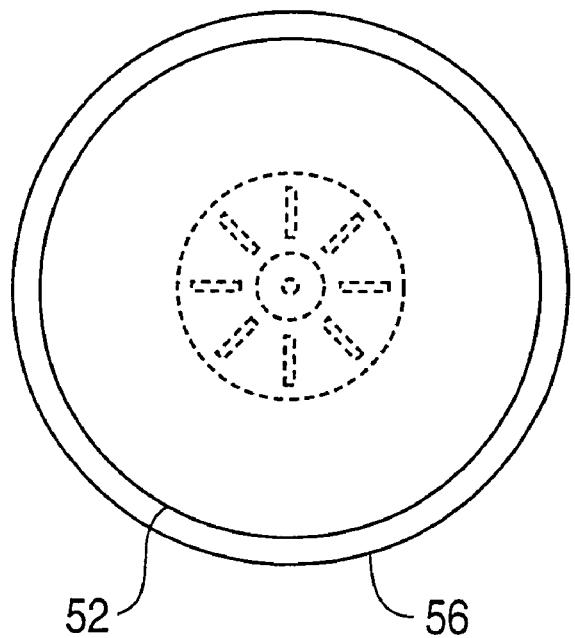

In both of the embodiments discussed above, the enclosure mechanism can be made as depicted in FIGS. 3 and 4 where FIG. 3 shows a side view and FIG. 4 shows a top view. The enclosure mechanism 50 includes a transparent plastic enclosure 52 mounted on a rotating base 54. In the embodiment where the display apparatus rotates with the enclosure, the display apparatus, such as the holographic projector, is housed within the rotating base 54. In the virtual rotation embodiment discussed above, the rotating base 54 would be transparent and the displayed scene would be projected through the rotating base 54 from a fixed base 56 in which the display apparatus would be housed. A bearing 58 (roller or ball) couples the rotating base 54 to the fixed base 56 and allows the base 54 to rotate about the vertical axis of the enclosure mechanism 50. In both the embodiments noted above, the mechanism 50 also includes a conventional rotary encoder 60 that outputs the rotational position of the enclosure 52 as it rotates. For embodiments where the display apparatus is in the fixed base 56, the transparent base 54 need not exist if a support bearing is on the periphery of the enclosure rather than in the center as shown. For a two-dimensional rotation freedom device such as depicted in FIG. 2, rotational sensors like those used for conventional track balls can be used to sense rotation in the two dimensions. For three-dimensional rotation, a similar scheme can be used but with an additional sensor to sense twisting of the ball (rotation in the third dimension).

Figure 5:
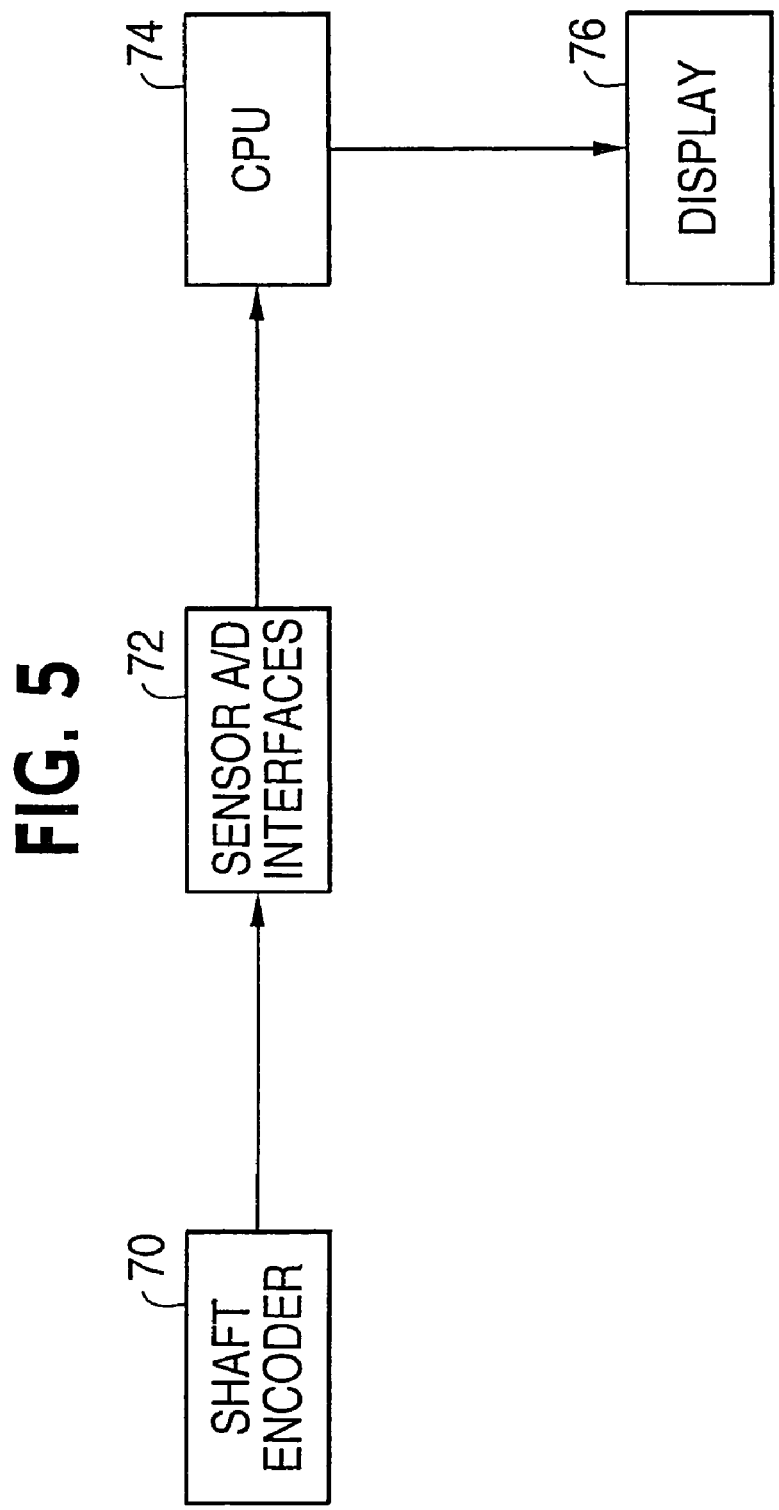
FIG. 5 depicts the digital hardware of the present invention.

The rotary encoder 60/70 (see FIG. 5) is coupled to a sensor A/D (Analog to Digital) converter 72 that supplies the rotational position to a computer 74. The computer 74 supplies the scene to be displayed to the display apparatus 76. The scene processing system being executed by the computer 74 is a conventional system that can rotate the scene or objects within the scene to different positions or viewpoints responsive to scene rotational position inputs. For example, the MAYA system available from Alias|Wavefront, Inc. is a system that can rotate computer generated graphical scenes or objects responsive to rotational inputs. When the computer detects that the enclosure has been rotated, the scene is virtually rotated within the enclosure with the computer 74 determining new positions of objects within the scene and rendering the scene with the new positions. Scene displays may also contain virtual widgets, such as three dimensionally positioned cursors, virtual keyboards, 3D manipulators, dialog boxes, etc. that are displayed within the enclosure. If such widgets exist within the scene, it may be necessary to adjust the position of the widgets within the scene as the scene rotates. For example, a virtual keyboard should always face the user even when the scene is rotated so that the keyboard is available for use by the user. However, a 3D cursor typically needs to remain at its last position within the scene as the scene rotates. That is, if the cursor is pointing at a door of a building it should remain pointing at the door of the building as the building moves within a rotating scene. As a result, the computer 74 also adjusts the positions of interface widgets, as necessary, within the scene responsive to the rotation as will be discussed in more detail later herein. When the display apparatus is rotated with the enclosure, the computer 74 need not determine scene positions but still determines and makes widget position adjustments as needed. In this embodiment, by limiting the redrawing to only widgets that need to remain stationary or rotate at a different rate than the scene, computational resources are more effectively used.

The rotation of the scene within the enclosure is typically a 1 for 1 rotation. That is, if the enclosure is rotated 10 degrees the displayed scene is rotated 10 degrees. It is also possible to rotate the displayed scene at a rate that is faster or slower than the rotation rate of the enclosure. Negative scene rotation with respect to enclosure rotation is also possible. Preferably, the user can set the rotational gain discussed above.

Figure 6:
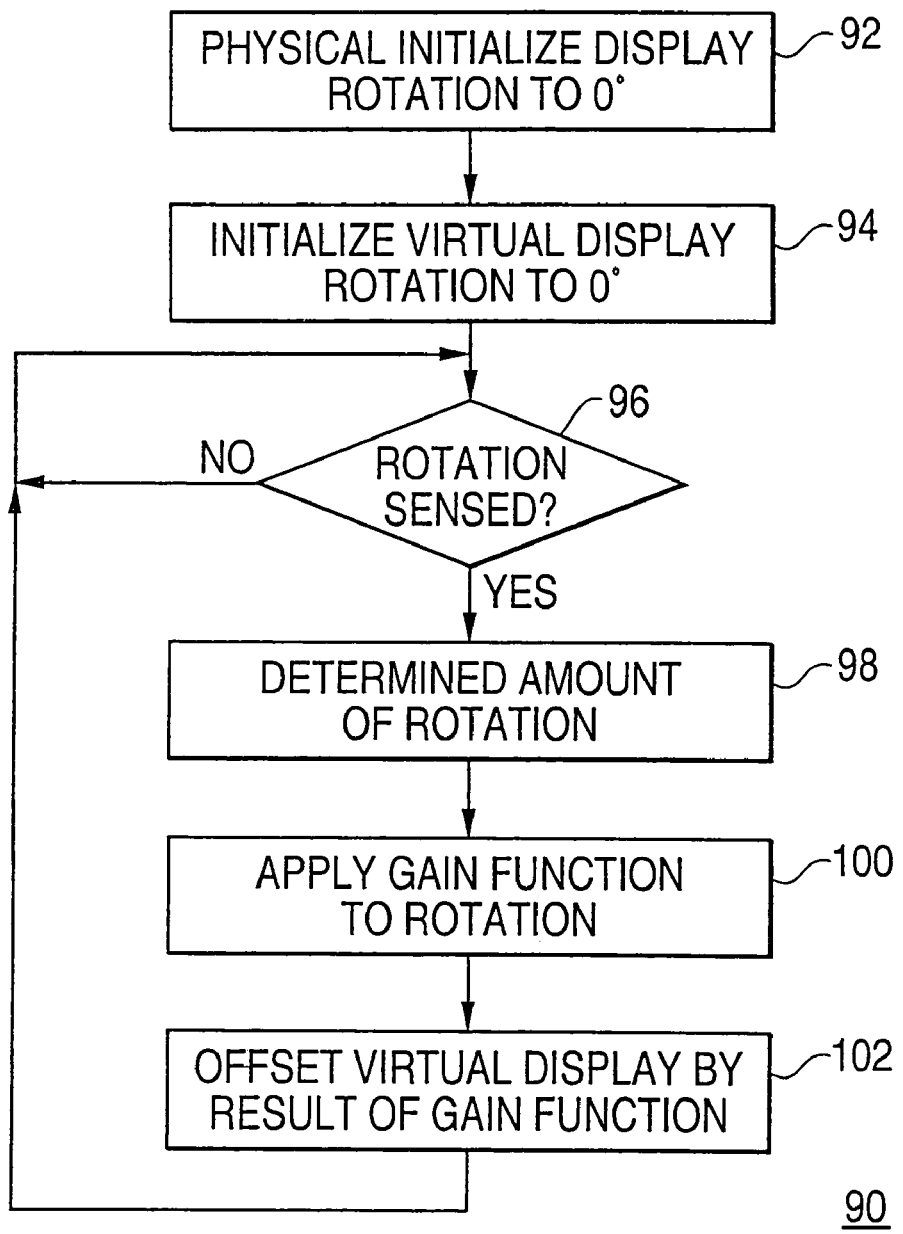
FIG. 6 shows the operations associated with rotating an enclosure and display contents.

The operations 90 (see FIG. 6) performed by the computer 74 start with initialization operations 92 and 94 where the physical and virtual rotational positions are set to zero. The system then determines 96, from the output of the encoder, whether the enclosure has been rotated. If not, the system loops back and waits for a rotational movement of the enclosure. If the enclosure has been rotated, the amount of and direction of virtual rotation, vr, is determined 98 followed by applying 100 a rotational gain function g to the physical rotation, rp. Typically the gain g is set to one. Here, the gain g is set to one so that $rv=(g-1)*rp=0*rp=0$. If the gain is set to a value greater than 1, the virtual rotation exceeds the physical rotation. The gain can also be set to less than one or to negative numbers. For example, when the gain equals 0.5 the display rotates slower than the enclosure. If the gain is negative the display rotates in the opposite direction of the enclosure. Lastly, when the gain is zero $rv=-rp$ and the display appears to remain fixed when the enclosure is rotated. Once the gain has been applied to the physical rotation, the virtual display position is offset 102 by the corresponding rotational amount. Then, the scene is rendered and provided to the display apparatus for display. The accelerated rotation of scene objects is discussed in more detail below with respect to FIGS. 7A-7C and 8A-8C.

Figure 7A:
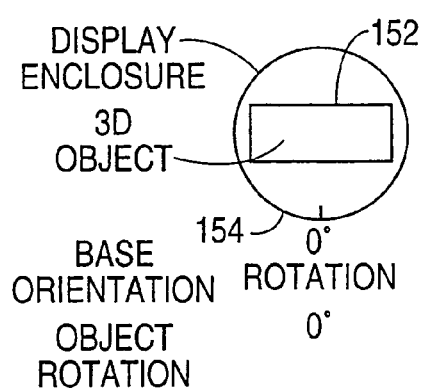
FIG. 7A-7C and 8A-8C depict unity and positive rotational gain, respectively.
Figure 7B:
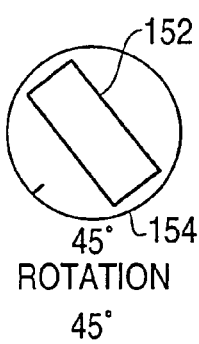
Figure 7C:
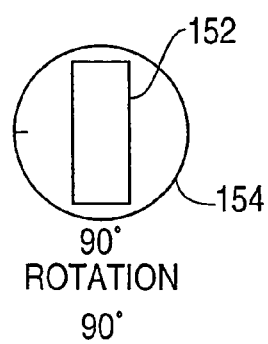
Figure 8A:
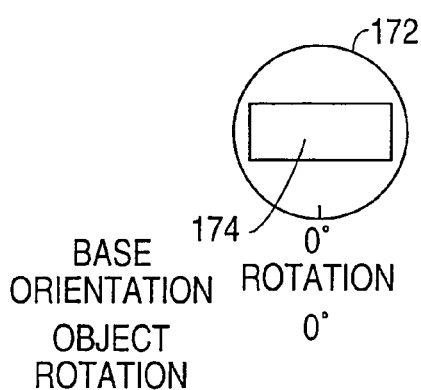
Figure 8B:
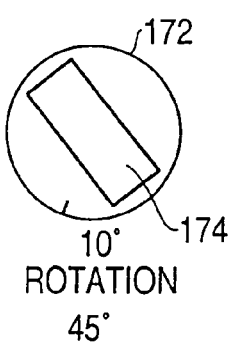
Figure 8C:
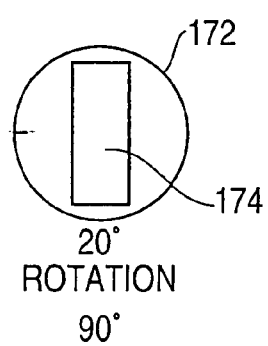

FIGS. 7A-7C with FIGS. 8A-8C depict accelerated rotation based on a gain of 1.0 and 4.5 respectfully. FIGS. 7A-7C depict a unity gain where the display follows the physical rotation of the enclosure 154. As can be seen when FIGS. 7A-7C are compared to FIGS. 8A-8C, when the enclosure 172 is rotated by 10 degrees from FIG. 8A to FIG. 8B, the object 174 is rotated by 45 degrees. Similarly when the enclosure is rotated to a 20-degree rotational position, the object is rotated by 90 degrees as depicted in FIG. 8C.

The virtual scene can also be constantly rotated, with the physical rotation adjusting the rate at which the scene is being rotated. For example, consider a virtual scene consisting of a swirling water current. Physically rotating the enclosure in the same direction of the water current speeds up the water flow. Rotating in the opposite direction, slows the water down.

Figure 9:
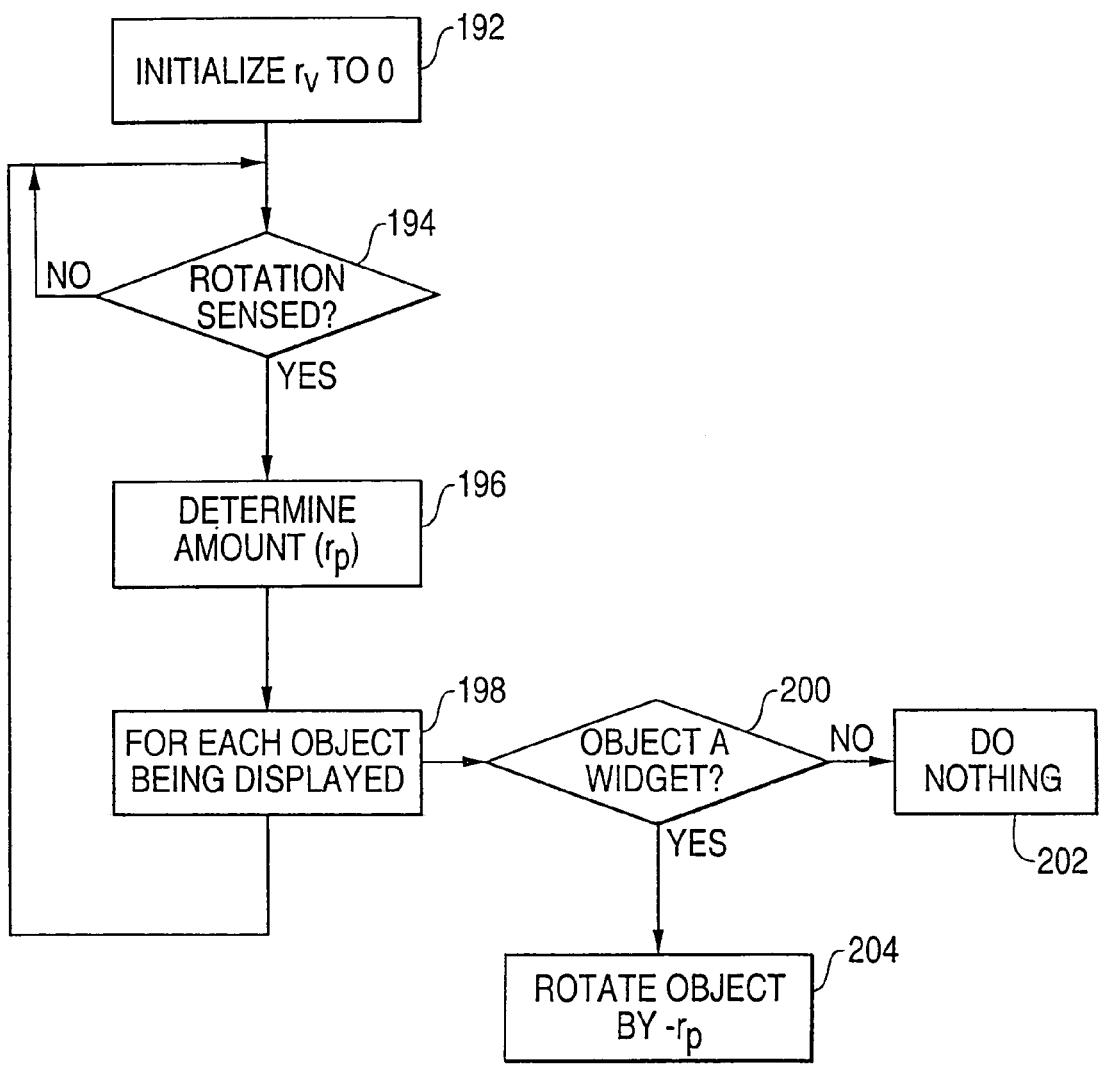
FIG. 9 illustrates operations with respect to widget objects within a rotating display.

When widgets are scene objects, or when parts of the scene need to be rotated at different rates, the rotation of each scene object is determined as depicted in FIG. 9. Once again the virtual and physical positions are initialized 192 followed by rotation sensing 194. Then, after the physical rotation amount is determined 196, for each scene object 198 (or segment that needs a different rotational gain), the type of each object in the scene is determined 200. If the object is not a widget, the system makes 202 no additional change in the rotation of the object. That is, the object is rotated in accordance with the discussion with respect to FIG. 6. If the object is a widget (or a segment of the display that needs to be rotated differently than the scene), the object is rotated 204 by the inverse of the physical rotation. If a gain has been applied, the object (widget or display segment) is rotated by the inverse of the gain adjusted physical rotation. The relative rotation of a scene object and the widgets allows scene objects to be rotated in front of the user while widgets remain stationary with respect to the user or a world coordinate system. This is discussed in more detail below with respect to FIGS. 10A-10C.

Figure 10A:
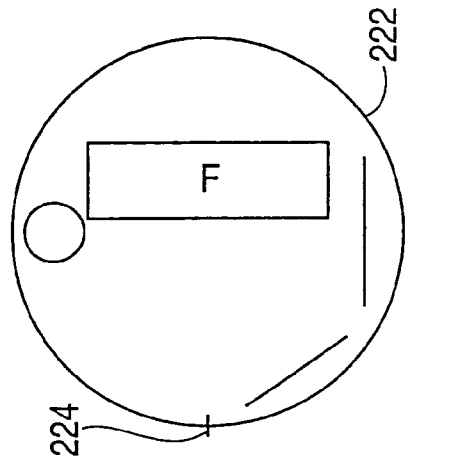
FIG. 10A-10C shows maintaining widgets stationary with respect to a user while scene objects rotate.
Figure 10B:
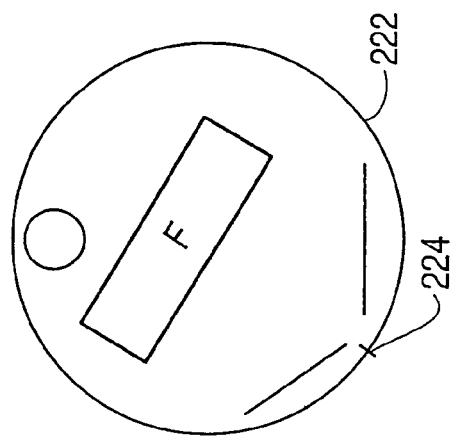
Figure 10C:
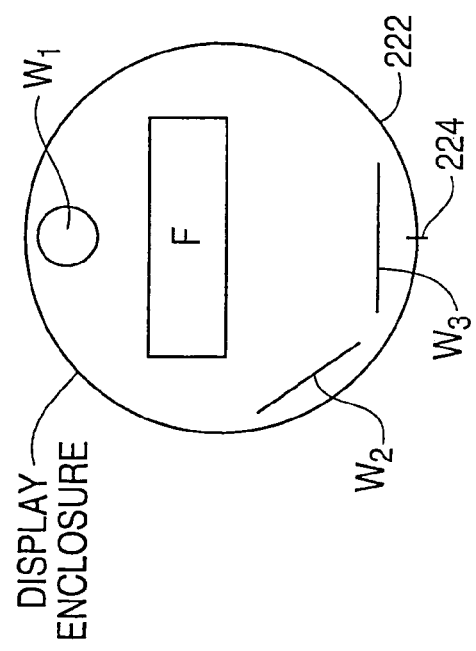

FIGS. 10A, 10B and 10C depict the inverse rotation of widgets relative to enclosure and scene rotation. FIG. 10A depicts a scene object F, three widgets w1, w2 and w3 that need to be maintained at the same or constant relative position with respect to the user, the enclosure 222 and an enclosure orientation indicator 224. In FIG. 10A the base orientation, widget orientation and scene object orientations are all at zero degrees. In FIG. 10B the enclosure 222 has been rotated by 45 degrees so that the scene object F has also been rotated by 45 degrees relative to the center of rotation which is at the center of the display. The widget positions have remained at zero degrees (that is, the widgets have been rotated a −45 degrees with respect to the enclosure). In FIG. 10C the enclosure 222 has been rotated by 90 degrees so that the object F has also been rotated by 90 degrees. Again, the widget positions have remained at zero degrees. That is, as the object and enclosure rotate with respect to the user, the widgets remain in the same relative position with respect to the user and with respect to a world coordinate system.

The widgets are discussed above as being adjusted continuously as the contents are rotated. It is also possible to adjust the widgets based on a rotational threshold. For example, a keyboard UI widget need not always be facing the user but can be oriented with respect to the user with some tilt. But when the tilt gets too large, such as above 10 degrees, the widget is rotated back to facing the user. Note that this may not happen all at once in the next display refresh cycle. Instead, the rotation could happen in increments until the final rotation amount is reached. This has the effect of preventing a visually jarring discontinuity by smoothly animating the widget to the final rotation position.

The relative positioning of widgets with respect to scene objects as the enclosure and scene objects rotate can be extended to be used with portions of the display contents that are designated. For example, one or more three-dimensional sections/parts/segments/sub-volumes of a volumetric display can be designated to remain stationary with respect to the user as the scene/enclosure rotate. For example, a scene of a landscape may be partitioned such that the landscape being modified rotates with the enclosure while a segment holding landscape elements, such as trees, bushes, rocks, remains stationary. This would facilitate the user selecting landscape elements and placing them in desired positions. Other effects can be created with different gains set for different segments of the display. Different rotational gains can also be set for different objects.

It is also possible for different rotational effects to be applied to different segments of the enclosure such that one segment rotates at a gain of one while another segment rotates with a gain of two.

It is also possible to have a secondary input stream control different sub-portions of the display while the display enclosure is being rotated. For example, suppose the user uses a mouse input device to click-on and hold a window in place while, with the other hand, they rotate the display. In this case, the window would not rotate with the display. This can be accomplished by assigning each object in the display a rotational gain of one and adjusting the gain of the selected window to negative one.

It is sometimes the case that the user may want to have a content rotation, once initiated, to continue for a specified period of time or, if the rotation is time indexed, until a specified time index is reached. FIG. 11 depicts an embodiment where the rotation is time sensitive. Once the enclosure rotation sensing 232 operation has been completed, the system performs a mode test. If the mode is set to a non-time based rotation mode, the system virtually rotates 236 the display contents in the direction of the physical rotation corresponding to the rotation of the enclosure as previously discussed. If the mode is set to a time based rotation, the system rotates the display contents and redraws 238 the display continuously until the time value set for the time based rotation expires or is reached. When in time mode, rotating the base effects only the temporal position of the time-based media (e.g., an animation or a movie). For example, rotating the enclosure clockwise by some unit amount may "scrub" advance the 2D/3D movie by one frame (i.e., next time increment). Rotating the enclosure counter-clockwise by a unit will decrement the 2D/3D movie by one frame.

The present invention has been described with the rotation of the enclosure causing the contents of the display to rotate. It is possible for the rotation of the enclosure to be applied to a specific object (or objects) designated by the user in the scene such that rotation of the enclosure causes the object to rotate about the object center of mass. Additionally, the center of rotation could be varied. For example, normally, the center of rotation is the central axis of the display. However, an object could be selected and then rotating the enclosure rotates the scene about the object's center axis. Note that rotation of the display contents around any arbitrary axis could be controlled by rotating the display enclosure.

The rotational offset of the enclosure could be used to control the rate at which the display contents are rotated. For example, rotating the enclosure 10 degrees to the right makes the display contents rotate at a rate of 10 degrees per second. Rotating the enclosure an additional 10 degrees increases the rotational rate to 20 degrees per second. This is accomplished using the joystick functions that control the rate of movement of virtual objects. Hence, the design variations of joysticks such as "spring-loaded", isotonic vs isometric and different rate control mappings are applied.

Position relative to the enclosure can be used to control rotation of the display. For example, suppose a virtual head is displayed in the volumetric display. Suppose the user approaches the display from the "back of the head" viewpoint. Touching the enclosure on this side causes the display content to rotate 180 degrees so the face of the head faces the user. This can be accomplished by designating a reference for an object and, when a touch occurs, rotating the contents to align the reference with the touch. Rather than using touch to signal position, voice or thermal sensing or any other position sensors could also be used.

The typical volumetric displays being manufactured today have mechanical components that have inertia that could cause the mechanical components to distort when the enclosure is rotated quickly. Distortion of the mechanical components can cause the display contents to be distorted. These types of distortion can be measured and the display compensated for these types of distortions.

The present invention has been described with respect to actually rotating the enclosure when rotating the scene. The present invention has been described with respect to using a shaft encoder and the enclosure rotating about a centrally positioned shaft. It is possible for the rotational bearing for the enclosure to be on the periphery of the enclosure and the encoder to be mounted to sense the rotation of the periphery of the enclosure. It is possible to provide a ring around the bottom of the display enclosure that can be rotated to rotate the display contents and to thereby not need to rotate the entire enclosure. It is possible, to sense a rotational rate force being applied to the enclosure or a circumferential ring via a rate controller sensor and virtually rotate the displayed scene accordingly. That is, the rotational force is sensed, the enclosure or ring does not actually rotate and the display rotates proportional to the force sensed.

The present invention has been described using rotary type encoders to sense rotational motion of the display. It is possible to use other types of sensors such as yaw, pitch and roll sensors to sense rotational force. It is also possible to mount roller wheels/balls around the periphery of the enclosure, sense the rotation of the roller wheels/balls and rotate the display contents accordingly without rotating the enclosure.

The volumetric display has been described as a dome or ball, however, other shapes, such as cubes, pyramids, etc., can be used for such displays. The volumetric display also need not have a complete enclosure and the display contents can be projected into an open volume or a partially enclosed volume.

It is possible to have a proxy object serve as a representation of the dome. This proxy object can be manipulated (i.e., rotated) and cause the corresponding actions to occur on the volumetric display. Floor sensors can serve to indicate a rotational amount or user position. The size of display may not be desktop scale but could be smaller (e.g., wristwatch or PDA) or much larger (e.g., room scale as in viewing a car) or even much larger (e.g., as in an amusement park ride scale).

Another variation is a "volumetric chameleon". In this variation a volumetric display is mounted on a mechanical armature or trolly that can sense it's position and orientation in space (i.e., "spatially-aware" display like the Chameleon). For example, imagine using a volumetric display for viewing the internals of a human body. At position A, the volumetric display shows a human liver. The operator then physically moves the volumetric display 16 inches up and 5 inches to the left. Along the way, the internal structures such as the stomach and lungs are displayed until the operator finally stops moving the display when the heart appears. This can be accomplished by sampling the position of the trolly. Using this 3D trolly position, the system finds a corresponding point in a 3D display map. The contents of the display map corresponding to the volume of the display at the corresponding point are transferred to the volumetric display.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:
a physically rotatable three-dimensional volumetric display enclosure having virtually rotatable display contents within the display; and
an interface controlling the rotation of the display contents with the interface being omni-directionally accessible and allowing a user to physically rotate the enclosure three-hundred and sixty degrees in three degrees of freedom and a portion of the contents virtually rotating in three dimensions response thereto, while another portion of the display contents remain in a static position, wherein at least a portion of said display contents is directly visible through said enclosure from all sides of said enclosure while said enclosure is static.

2. An apparatus as recited in claim 1, wherein the interface is omni-directionally controllable.

3. A method, comprising:
determining physical movement of a volumetric display enclosure applied by a user in three-hundred and sixty degrees in three degrees of freedom; and
displaying and moving a portion of virtual display contents within a volumetric display responsive to the movement, while displaying and maintaining another portion of display contents in a static position, wherein at least a portion of said display contents is directly visible through said enclosure from all sides of said enclosure while said enclosure is static.

4. A method, comprising:
physically rotating a volumetric display in three-hundred and sixty degrees in three degrees of freedom, and
displaying and rotating a portion of virtual contents in three dimensions within the display in correspondence to the rotation of the display, while displaying and maintaining another portion of display contents in a static position, wherein at least a portion of said display contents is directly visible through said enclosure from all sides of said enclosure while said enclosure is static.

5. A method, comprising:
physically rotating a display view orientation controller for a three dimensional display responsive to user rotational inputs applied physically to a display enclosure to rotate the display three-hundred and sixty degrees in three degrees of freedom; and
displaying and virtually rotating a portion of the display contents within the display in three dimensions responsive to rotation of the controller, while displaying and maintaining another portion of the display contents in a static position, wherein at least a portion of said display contents is directly visible through said enclosure from all sides of said enclosure while said enclosure is static.

6. A method, comprising:
physically rotating a rotatable user input device for a three dimensional display responsive to user rotational inputs applied physically to a display enclosure to rotate the display three-hundred and sixty degrees in three degrees of freedom; and
displaying and virtually rotating a portion of the display contents within the display in three dimensions responsive to rotation of the controller, while displaying and maintaining another portion of the display contents in a static position, wherein at least a portion of said display contents is directly visible through said enclosure from all sides of said enclosure while said enclosure is static.

7. A method as recited in claim 6, wherein the rotational inputs comprise inputs indicating actual rotation of the enclosure.

8. A method as recited in claim 6, wherein the rotation of the display contents is responsive to a time value.

9. A method as recited in claim 6, wherein a display apparatus rotates with the enclosure.

10. A method as recited in claim 6, wherein a gain is applied to the virtual rotation.

11. A method as recited in claim 10, wherein the gain is one of positive and negative.

12. A method as recited in claim 10, wherein the gain is one of less than one and greater than one.

13. A method, comprising:
physically rotating a volume rotational controller for a three dimensional volumetric display responsive to user rotational inputs physically applied by a person to a display enclosure displaying three dimensional volumetric display contents to physically rotate the display three-hundred and sixty degrees in three degrees of freedom, wherein at least a portion of said display contents is directly visible through said enclosure from all sides of said enclosure while said enclosure is static; and
virtually rotating a portion of the display contents within the display in three dimensions responsive to rotation of the controller, while maintaining another portion of the display contents in a static position, and
wherein said rotational inputs comprise a physical application of force directly applied by the person to said three dimensional volumetric display enclosure wherein the rotational inputs comprise a rotational force.

14. A method, comprising:
physically rotating a volume rotational controller for a three dimensional volumetric display responsive to user rotational inputs physically applied by the user to a display enclosure displaying three dimensional volumetric display contents to physically rotate the display three-hundred and sixty degrees in three degrees of freedom, wherein at least a portion of said display contents is directly visible through said enclosure from all sides of said enclosure while said enclosure is static; and
virtually rotating a portion of the display contents within the display in three dimensions responsive to rotation of the controller, while maintaining another portion of the display contents in a static position, and
wherein the display is divided into two or more segments and the segments each rotate with a different gain responsive to the rotational inputs.

15. A method, comprising:
physically rotating a volume rotational controller for a three dimensional volumetric display responsive to user rotational inputs physically applied by the user to a display enclosure to physically rotate the display three-hundred and sixty degrees in three degrees of freedom and displaying three dimensional volumetric display contents, wherein at least a portion of said display contents is directly visible through said enclosure from all sides of said enclosure while said enclosure is static; and
virtually rotating a portion of the display contents within the display in three dimensions responsive to physical rotation of the controller, while maintaining another portion of the display contents in a static position, and
wherein said volume rotational controller is contoured to said three dimensional volumetric display.

16. A method, comprising:
displaying display contents via a volumetric display having an enclosure with a base;
physically rotating the enclosure responsive to user rotational inputs applied physically to the enclosure base by the user to physically rotate the display three-hundred and sixty degrees in three degrees of freedom, wherein at least a portion of said display contents is directly visible through said enclosure from all sides of the enclosure while said enclosure is static; and
virtually rotating a portion of the display contents within the display in three dimensions responsive to rotation of the enclosure, while maintaining another portion of the display contents in a static position.

17. The method according to claim 16, wherein rotating the display contents changes the volumetric orientation of the display contents relative to the user to reveal at least one of hidden and obscured display content.

18. A method, comprising:
displaying display contents via a volumetric display having an enclosure;
physically rotating the enclosure in any rotatable direction responsive to user rotational inputs applied physically to the enclosure by the user to rotate the display three-hundred and sixty degrees in three degrees of freedom, wherein at least a portion of said display contents is directly visible through said enclosure from all sides of said enclosure while said enclosure is static; and
virtually rotating a portion of the display contents within the display in three dimensions responsive to physical rotation of the enclosure, while maintaining another portion of the display contents in a static position.

19. A method, comprising:
displaying display contents via a volumetric display having an enclosure;
physically rotating the enclosure responsive to user rotational inputs applied physically to the enclosure by the user to physically rotate the display three-hundred and sixty degrees in three degrees of freedom, wherein at least a portion of said display contents is directly visible through said enclosure from all sides of said enclosure while said enclosure is static; and
virtually rotating a portion of the display contents within the display in three dimensions relative to physical rotation of the enclosure, while maintaining another portion of the display contents in a static position.

20. A method, comprising:
physically rotating a display view orientation controller for a three dimensional volumetric display responsive to user rotational inputs applied physically to a display enclosure to physically rotate the display three-hundred and sixty degrees in three degrees of freedom;
displaying display widgets within the volumetric display; and
virtually rotating a first grouping of the display widgets within the display responsive to the physical rotating while maintaining a second grouping of the display widgets stationary within the display, wherein at least a portion of display widgets is directly visible through said enclosure from all sides of said enclosure while said enclosure is static.

21. A method, comprising:
physically rotating a display view orientation controller for a three dimensional volumetric display responsive to user rotational inputs applied physically to a display enclosure to physically rotate the display three-hundred and sixty degrees in three degrees of freedom; and
displaying and virtually rotating a portion of display contents within the display in three dimensions responsive to rotation of the controller, wherein at least a portion of the display contents is directly visible through said enclosure from all sides of said enclosure while said enclosure is static.

22. A method as recited in claim 21, wherein the rotational inputs comprise a rotational force.

23. A method as recited in claim 21, wherein the rotational inputs comprise inputs indicating actual rotation of the enclosure.

24. A method as recited in claim 21, wherein the rotation of the display contents is responsive to a time value.

25. A method as recited in claim 21, wherein a display apparatus rotates with the enclosure.

26. A method as recited in claim 21, wherein a gain is applied to the virtual rotation.

27. A method as recited in claim 26, wherein the gain is one of positive and negative.

28. A method as recited in claim 26, wherein the gain is one of less than one and greater than one.

29. A method as recited in claim 21, wherein the display includes scene objects and widgets and further comprising virtually rotating the widgets differently than the scene objects.

30. A method as recited in claim 29, wherein the widgets remain stationary with respect to the user as the scene objects rotate.

31. A computer readable medium for controlling a computer and storing a program which causes the computer to execute a process, comprising:
physically rotating a display view orientation controller for a three dimensional volumetric display responsive to user rotational inputs applied physically to a display enclosure to physically rotate the display three-hundred and sixty degrees in three degrees of freedom; and
displaying and virtually rotating a portion of display contents within the display in three dimensions responsive to rotation of the controller, wherein at least a portion of the display contents is directly visible through said enclosure from all sides of said enclosure while said enclosure is static.

32. An apparatus, comprising:
a display view orientation controller;
a three dimensional volumetric display physically rotating responsive to user rotational inputs applied physically to a display enclosure to physically rotate the display three-hundred and sixty degrees in three degrees of freedom; and
a portion of display contents displaying and virtually rotating within the display in three dimensions responsive to rotation of the controller, wherein at least a portion of the display contents is directly visible through said enclosure from all sides of said enclosure while said enclosure is static.

* * * * *

UNITED STATES PATENT AND TRADEMARK OFFICE
CERTIFICATE OF CORRECTION

PATENT NO. : 7,724,251 B2  Page 1 of 1
APPLICATION NO. : 11/207828
DATED : May 25, 2010
INVENTOR(S) : Ravin Balakrishnan et al.

It is certified that error appears in the above-identified patent and that said Letters Patent is hereby corrected as shown below:

Sheet 4 of 8 (Below Reference Numeral 90) (Fig. 6) delete "EXAGERATES" and insert --EXAGGERATES--.

Column 2, Line 55 (Approx.) delete "FIG." and insert --FIGS.--.

Column 2, Line 59 (Approx.) delete "FIG." and insert --FIGS.--.

Column 11, Line 15, delete "of display" and insert --of said display--.

Signed and Sealed this

Twenty-first Day of December, 2010

David J. Kappos
*Director of the United States Patent and Trademark Office*